(12) United States Patent
Sakane

(10) Patent No.: US 8,078,331 B2
(45) Date of Patent: Dec. 13, 2011

(54) POWER SUPPLY CONTROL SYSTEM AND METHOD OF CONTROLLING POWER SUPPLY

(75) Inventor: Hiroyuki Sakane, Anjo (JP)

(73) Assignee: Denso Corporation, Kariya (JP)

( * ) Notice: Subject to any disclaimer, the term of this patent is extended or adjusted under 35 U.S.C. 154(b) by 571 days.

(21) Appl. No.: 12/233,152

(22) Filed: Sep. 18, 2008

(65) Prior Publication Data

US 2009/0082909 A1 Mar. 26, 2009

(30) Foreign Application Priority Data

Sep. 26, 2007 (JP) ................................ 2007-249463

(51) Int. Cl.
*G05D 3/12* (2006.01)
*H02H 3/08* (2006.01)
(52) U.S. Cl. ............ 700/293; 700/22; 700/79; 700/292; 700/295; 713/300; 361/93.2
(58) Field of Classification Search ............... 700/22, 700/292, 293; 340/650, 653, 654; 307/9.1, 307/10.1, 10.7; 323/276, 277; 361/5, 63, 361/87, 89, 93.1, 93.2, 93.9, 94, 95
See application file for complete search history.

(56) References Cited

U.S. PATENT DOCUMENTS

| | | | | |
|---|---|---|---|---|
| 5,907,238 A * | 5/1999 | Owerko et al. | ............... | 323/349 |
| 6,320,275 B1 | 11/2001 | Okamoto et al. | | |
| 6,965,502 B2 * | 11/2005 | Duffy et al. | ............... | 361/18 |
| 7,062,664 B2 * | 6/2006 | Date et al. | ............... | 713/320 |
| 7,401,237 B2 * | 7/2008 | Hara | ............... | 713/300 |
| 7,539,882 B2 * | 5/2009 | Jessup et al. | ............... | 713/300 |
| 7,564,667 B2 * | 7/2009 | Veroni | ............... | 361/93.1 |
| 7,616,108 B2 * | 11/2009 | Shank et al. | ............... | 340/458 |
| 7,617,406 B2 * | 11/2009 | Yasuo | ............... | 713/320 |
| 7,626,791 B2 * | 12/2009 | Newman et al. | ............... | 361/63 |
| 7,738,227 B2 * | 6/2010 | Fang et al. | ............... | 361/93.1 |
| 7,813,752 B2 * | 10/2010 | Lehr et al. | ............... | 455/522 |
| 2007/0135155 A1 * | 6/2007 | Lehr et al. | ............... | 455/522 |

FOREIGN PATENT DOCUMENTS

| | | |
|---|---|---|
| JP | 5-22834 | 1/1993 |
| JP | 2000-236621 | 8/2000 |
| JP | 2000-245055 | 9/2000 |
| JP | 2001-160747 | 6/2001 |
| JP | 2004-248452 | 9/2004 |
| JP | 2005-328632 | 11/2005 |

* cited by examiner

*Primary Examiner* — Dave Robertson
(74) *Attorney, Agent, or Firm* — Nixon & Vanderhye PC

(57) ABSTRACT

A power supply control system includes a plurality of electronic control units, a monitoring device, a power source line coupled with each of the electronic control units for supplying an operating voltage to each of the electronic control units, and a power source switch disposed on the power source line. The monitoring device calculates a deactivating threshold value based on an assigned threshold value of each of the electronic control units set in accordance with an operating state of each of the electronic control units. The monitoring device deactivates the power source switch so as to stop the supply of the operating voltage to all of the electronic control units when an electric current value of the power source line is greater than the deactivating threshold value.

14 Claims, 7 Drawing Sheets

POWER SUPPLY CONTROL SYSTEM AND METHOD OF CONTROLLING POWER SUPPLY

CROSS REFERENCE TO RELATED APPLICATIONS

The present application is based on and claims priority to Japanese Patent Application No. 2007-249463 filed on Sep. 26, 2007, the contents of which are incorporated in their entirety herein by reference.

BACKGROUND OF THE INVENTION

1. Field of the Invention

The present invention relates to a power supply control system and a method controlling a power supply.

2. Description of the Related Art

The number and kinds of electronic devices provided in a vehicle tend to increase year by year. The electronic devices are jointly controlled by a plurality of control devices that is coupled through a communicating line. Even when a control device that takes charge of controlling respective electronic devices is different from one electronic device to another, a power supply system is often shared by the control devices. For example, the control devices for controlling the electronic devices provided in the vehicle are coupled with a battery equipped in the vehicle through a power source line. When the total amount of electric current that flows in the power source line, i.e., the total amount of consumption current of all the control devices exceeds a threshold current value, a fuse provided on the power source line may be blown out and the power supply to all the control devices may be cut off.

In the present case, the threshold current value is fixed based on a property of the fuse regardless of an operating state of each of the control devices. Specifically, a maximum current value is calculated for each of the control devices and the total amount of the maximum current values is set as the threshold current value for disconnecting the power source line. However, an actual maximum current value of each of the control devices may vary in accordance with a position of an ignition switch. When the ignition switch is set at an IG-ON position, an engine of the vehicle is activated. When the ignition switch is set at an IG-OFF position or an ACC-ON position, the engine is deactivated. When the ignition switch is set at the IG-OFF position or the ACC-ON position, some connected load may be deactivated. Thus, some control devices may transfer to a sleep mode (i.e., power-saving mode). In the sleep mode, the control device may have a back up of control parameters using a random access memory (RAM) and a clock operation of a central processing unit (CPU) may be stopped. When the control device is set to the sleep mode, a current value to be determined as an abnormal current value may be much lower than that in a run mode in which the control device is normally operated and the clock operation of the CPU is performed. However, even when the control device is set to the sleep mode, the threshold current value for disconnecting the power source line remains a high current value that corresponds to the run mode. In the present case, the power source line can be disconnected when the power source line is shorted and a high electric current will apparently flow. However, if the clock operation of the CPU is continued, for example, due to a runaway, in the control device that should be at the sleep mode, and thereby the current value becomes an abnormal level at the sleep mode, the power source line is difficult to be disconnected when the current value is within the normal level at the run mode. Thus, a battery drain may be caused by the runaway.

JP-A-2000-236621 and JP-A-2000-245055 respectively disclose a power supply control system that sets a threshold value for disconnecting a power source to be variable. The threshold value is varied in accordance with an operating state of a plurality of electronic devices coupled with one control device configured by a microcomputer or the number of connected load. In the present case, a power source disconnecting unit is provided to each of the control device. Thus, a cost of the power supply control system may increase.

SUMMARY OF THE INVENTION

In view of the foregoing problems, it is an object of the present invention to provide a power supply control system. Another object of the present invention is to provide a method of controlling a power supply.

A power supply control system according to an aspect of the invention includes a plurality of electronic control units, a monitoring device, a communicating line, a power source line, and a power source switch. Each of the electronic control units is configured to control an electronic device independently of the others of the electronic control units. The communicating line couples each of the electronic control units and the monitoring device. The power source line is coupled with each of the electronic control units for supplying an operating voltage to each of the electronic control units. The power source switch is disposed on the power source line and is configured to stop the supply of the operating voltage to all of the electronic control units when the power source switch is deactivated. Each of the electronic control units or the monitoring device sets an assigned threshold value of each of the electronic control units in accordance with an operating state of each of the electronic control units. Each of the plurality of electronic control units transmits information about the operating state or the assigned threshold value set in accordance with the operating state to the monitoring device through the communicating line. The monitoring device calculates a deactivating threshold value based on the assigned threshold value of each of the electronic control units. The monitoring device detects an electric current value of the power source line. The monitoring device deactivates the power source switch when the electric current value is greater than the deactivating threshold value.

In a method according to another aspect of the invention, a power supply from a power source line to a plurality of electronic control units coupled with the power source line is controlled. In the method, an assigned threshold value of each of the electronic control units is set in accordance with an operating state of each of the electronic control units. A deactivating threshold value is calculated based on the assigned threshold value of each of the electronic control units. An electric current value of the power source line is detected and it is determined whether the electric current value is greater than the deactivating threshold value. A power source switch provided on the power source line is deactivated when the electric current value is greater than the deactivating threshold value so as to stop the power supply from the power source line to all of the electronic control units.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

Figure 1A:
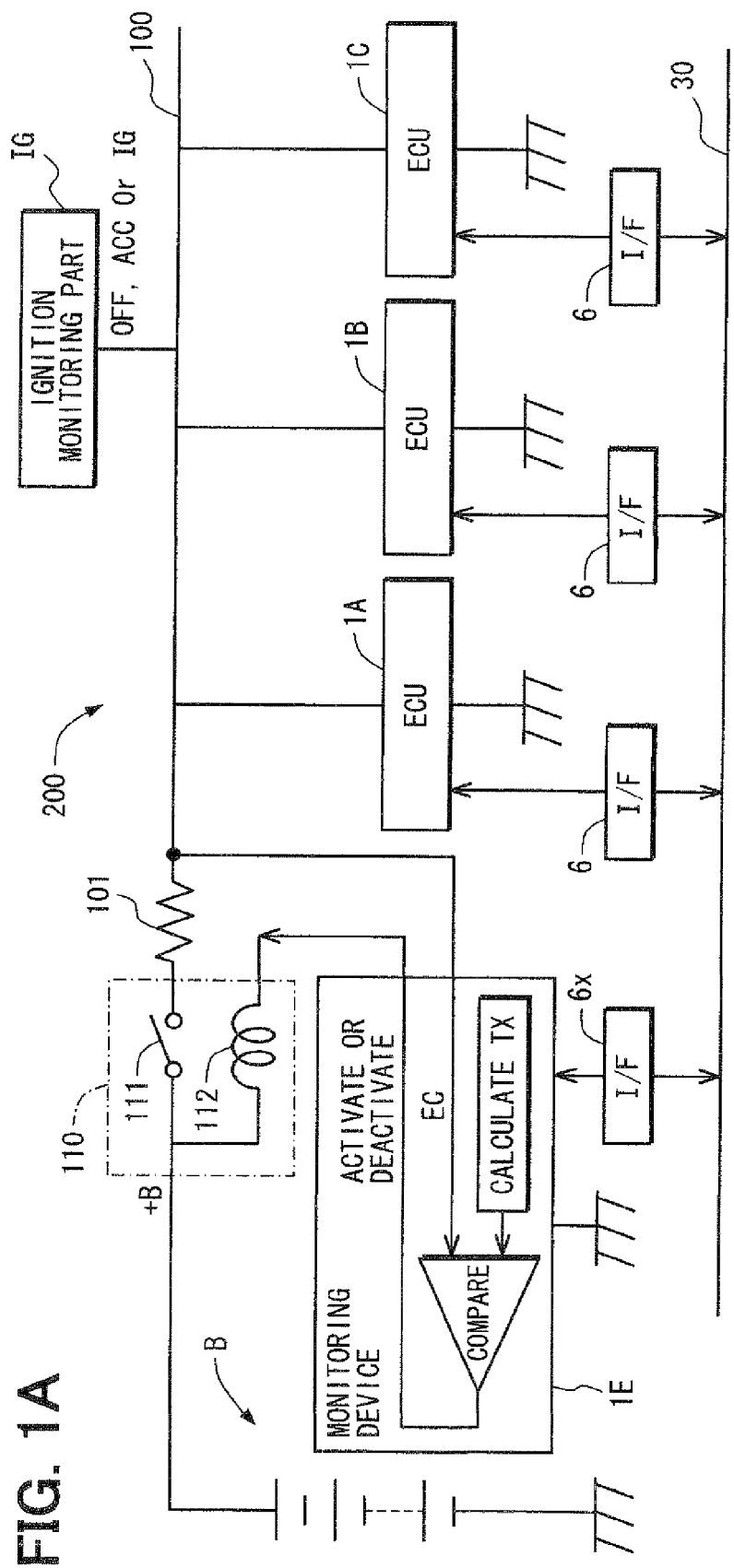
FIG. 1A is a block diagram illustrating a power supply control system according to an exemplary embodiment of the invention and FIG. 1B is a diagram illustrating an ignition switch.
Figure 1B:
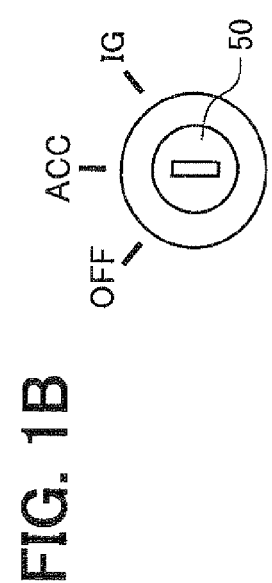

A power supply control system 200 according to an exemplary embodiment of the invention will be described with reference to FIG. 1A and FIG. 1B. The power supply control system 200 includes three electronic control units (ECUs) 1A, 1B, and 1C. Each of the ECUs 1A-1C controls an electronic device independently of the others of the ECUs 1A-1C. The ECUs 1A-1C are coupled with a monitoring device 1E through a communicating line 30. The monitoring device 1E is configured to monitor a power-receiving state of each of the ECUs 1A-1C. An operating voltage is supplied to the ECUs 1A-1C through a power source line 100. On the power source line 100, a power source switch 110 is provided. The power source switch 110 is configured to stop the supply of the operating voltage to all of the ECUs 1A-1C at a time. The ECUs 1A-1C are provided for controlling the electronic devices provided in a vehicle, for example. The power source line 100 receives a power source voltage (i.e., the operating voltage) from a battery B in the vehicle.

Each of the ECUs 1A-1C and the monitoring device 1E includes a microcomputer. The communicating line 30 may be made of a serial communication bus such as a controller area network communication (CAN communication) and a local interconnect network communication (LIN communication), for example. At least a part of the communication line 30 may be made of a radio communication bus. The power source switch 110 may be configured as a relay switch including a single pole single throw switch (SPST switch) 111 and a solenoid 112, for example. The SPST switch 111 is a mechanical contact type and the solenoid 112 drives the SPST switch 111. The power source switch 110 may also be configured as a semiconductor switch using a transistor or a thyristor.

The ECUs 1A-1C coupled with the power source line 100 are divided into a plurality of power source systems. A selector switch is provided for selecting a power-receiving state of each of the ECUs 1A-1C that receives the operating voltage from the power source line 100. For example, the selector switch is provided by an ignition switch 50. As shown in FIG. 1B, the ignition switch 50 is set at an IG-OFF position, an ACC-ON position or an IG-ON position. When the ignition switch 50 is set at the IG-OFF position, an engine and accessories including a car audio system, a car navigation device, and power windows are deenergized. When the ignition switch 50 is set at the ACC-ON position, the accessories are energized and the engine is deenergized. When the ignition switch 50 is set at the IG-ON position, the engine and the accessories are energized. The selected position of the ignition switch 50 is monitored by an ignition monitoring part 1G coupled with the communicating line 30, Each of the monitoring device 1E and the ECUs 1A-1C receives a signal in accordance with the monitored result from the ignition monitoring part 1G through the communicating line 30.

Figure 2:
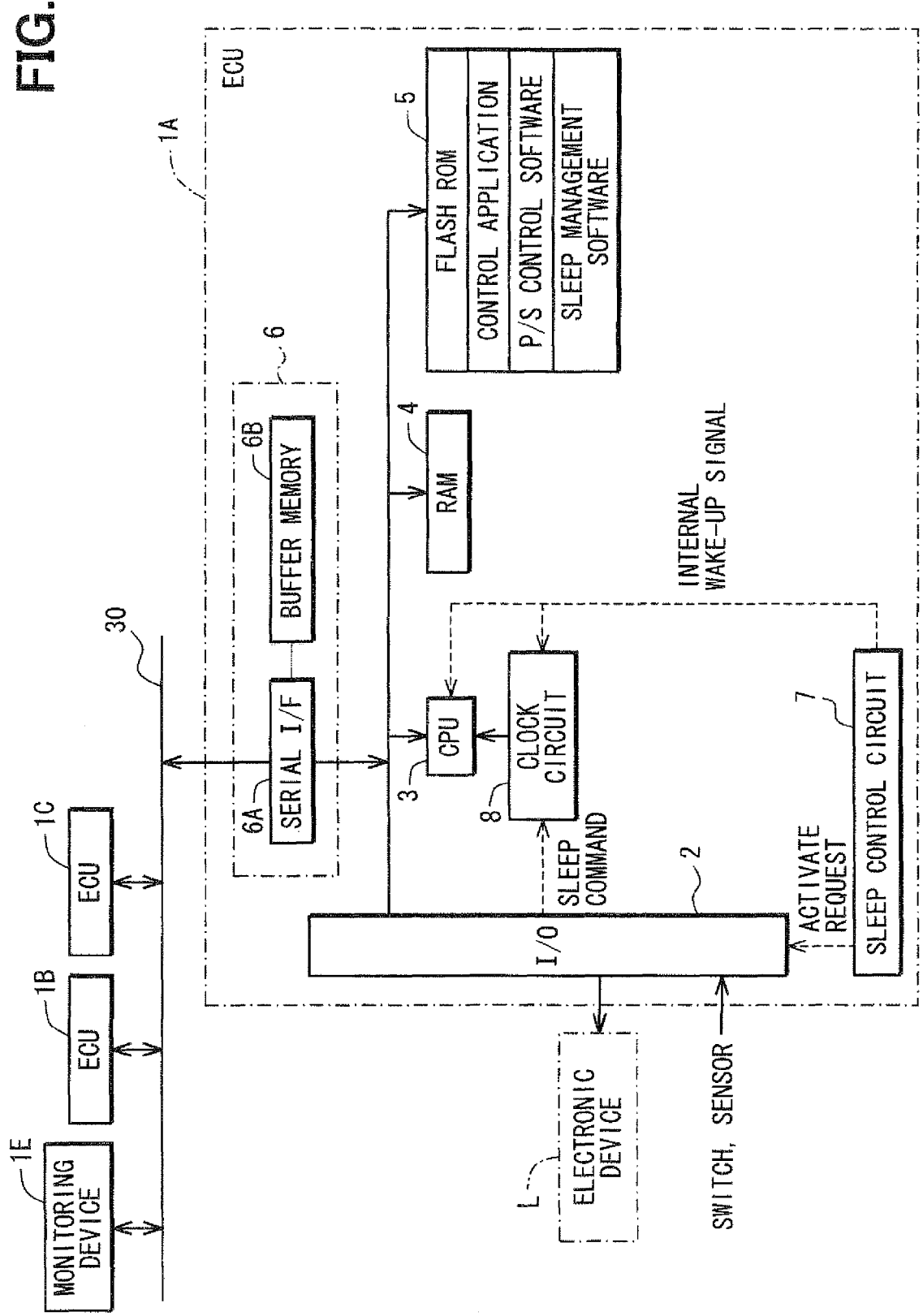
FIG. 2 is a block diagram illustrating an electronic control unit according to the exemplary embodiment.

The ECUs 1A-1C have similar electronic configurations. Thus, an exemplary configuration of the ECU 1A will be described on behalf of all of the ECUs 1A-1C. As illustrated in FIG. 2, the ECU 1A includes a central processing unit (CPU) 3, a random access memory (RAM) 4, a read only memory (ROM) 5, and input/output device (I/O) 2 that are coupled through an internal bus. The internal bus is coupled with the communicating line 30 through a communication interface (I/F) 6. The communication interface 6 includes a serial interface (serial I/F) 6A and a communication buffer memory 6B. The input/output device 2 is coupled with the electronic device L through a driver (not shown). The electronic device (load) L is a controlled object of the ECU 1A. The input/output device 2 is further coupled with a sensor or a switch that inputs a signal to the input/output device 2. The CPU 3 executes a control application stored in the ROM 5 so as to control the electronic device L. If necessary, the CPU 3 controls the electronic device L with referring to the input signal from the switch or the sensor or control information transmitted from an external control device through the communicating line 30. The ECU 1A and the electronic device L receive the operating voltage from the power source line 100. The ROM 5 further includes a power source control software (P/S control software).

The ECU 1A transfers to a sleep mode (i.e., a power-saving mode) under a predetermined condition. For example, the ECU 1A transfers to the sleep mode when the vehicle is parked or when the switch is not operated. Specifically, when an operation of all applications is finished and the ECU 1A is in a standby state, a clock circuit 8 for transmitting an operating clock signal to the CPU 3 is deactivated, and thereby the ECU 1A transfers to the sleep mode. This transfer is performed based on a sleep management software stored in the ROM 5. The control application may include a plurality of applications. The control application is capable of transferring to the sleep mode when a predetermined period has elapsed in a state where an activate request to a corresponding function is not input. When an activate request for a function related to another software is input, not the whole CPU 3 can be transferred to the sleep mode.

The CPU 3 which has been transferred to the sleep mode wakes up by receiving the activate request to any of the applications from an external device as an external wake-up signal. Some activate requests cannot be detected if the CPU 3 does not wake up even temporarily. Thus, when one application is required to be activated by using the input of the activate request as a trigger, the one application is required to wake up periodically even when the one application is in the sleep mode. If the one application does not receive the activate request, the one application returns to the sleep mode. That is, when the activate request to any of the applications is not input from the external device, the CPU 3 is transferred to the sleep mode. After that, a predetermined sleep period and a predetermined wake-up period in which the CPU 3 wakes up for confirming the presence or absence of the activate request are repeated. This process of repeating the sleep period and wake-up period (i.e., internal wake-up process) is performed by the sleep management software and a sleep control circuit 7. The sleep control circuit 7 is configured as a hardware different from the CPU 3.

In the internal wake-up process, a requested wake-up period differs from application to application. Furthermore, a period from a time when the CPU 3 wakes up due to the external wake-up signal to a time when the CPU 3 transfers to the sleep mode again differs from application to application. The sleep management software has a timer routine. The sleep management software detects a receiving time when each of the applications receives the activate request from the external device. When the input of the activate request for all of the applications is stopped, the sleep management software determines that the applications transfers to a common deactivated period. The sleep management software receives the requested wake-up period of each of the applications and extracts a shortest wake-up period. After the predetermined period has elapsed since the applications transfer to the common deactivated period, the extracted shortest wake-up period is set to a sleep timer provided in the sleep control circuit 7, and the CPU 3 is transferred to the sleep mode.

The CPU 3 transferred to the sleep mode stops an operation as an arithmetic circuit. Thus, the CPU 3 cannot wake up by itself. When the wake-up period set to the sleep timer has elapsed, the sleep control circuit 7 transmits a activate signal (i.e., internal wake-up signal) to the clock circuit 8 so as to activate the CPU 3. In addition, the sleep control circuit 7 transmits an interrupting activate signal (internal wake-up signal) to the CPU 3. When the CPU 3 receives the interrupting activate signal, a resource setting process is performed by a predetermined interrupting process, and thereby the CPU 3 wakes up.

Figure 3:
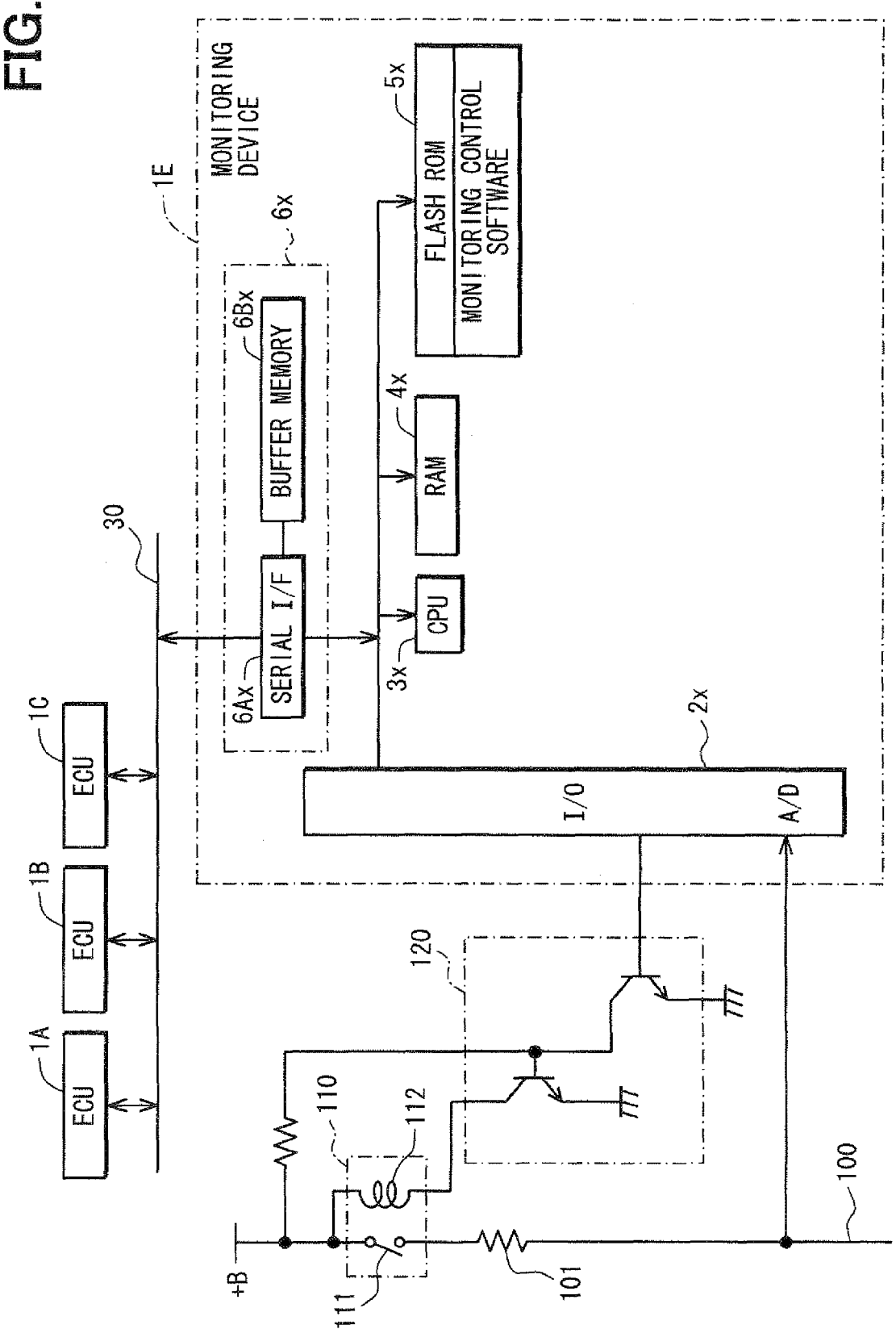
FIG. 3 is a block diagram illustrating a monitoring device according to the exemplary embodiment.

An exemplary configuration of the monitoring device 1E will now be described with reference to FIG. 3. The monitoring device 1E is an electronic control unit including a CPU 3x, a RAM 4x, a ROM 5x, and an input/output device (I/O) 2x that are coupled through an internal bus. The internal bus is coupled with the communicating line 30 through a communication interface (I/F) 6x. The communication interface 6x includes a serial interface (serial I/F) 6Ax and a communication buffer memory 6Bx. As shown in FIG. 1, a shunt resistance 101 is disposed on the power source line 100. The shunt resistance 101 is closer to the battery B than the ECUs 1A-1C are. As shown in FIG. 3, the power source line 100 located on a ground side of the shunt resistance 101 is diverged. One of the diverged lines is coupled with an analog-digital port (A/D) of the input/output device 2x so as to input a current detecting voltage. The input/output device 2x outputs a control signal to an activating driver 120 of the power source switch 110 so as to control an conducting state of the power source switch 110. The CPU 3x executes a monitoring control software stored in the ROM 5x.

In each of the ECUs 1A-1C, the CPU 3 executes the P/S control software. In the monitoring device 1E, the CPU 3x executes the monitoring control software. An assigned threshold value setting means and a self-information transmitting means are provided by the CPU 3 and the P/S control software of each of the ECUs 1A-1C, for example. A deactivating threshold value calculating means, an electric current value detecting means, and a power-source switch deactivating means are provided by the CPU 3x and the monitoring control software of the monitoring device 1E, for example. The assigned threshold value calculating means calculates an assigned threshold value of each of the ECUs 1A-1C based on an operating state of each of the ECUs 1A-1C. The assigned threshold value setting means may also be provided by the monitoring device 1E. In the present case, the monitoring device 1E may receive information about the operating state of each of the ECUs 1A-1C and may calculate the assigned threshold value corresponding to the operating state. The self-information transmitting means transmits information about the operating state of each of the ECUs 1A-1C or the assigned threshold value corresponding to the operating state to the monitoring device 1E through the communicating line 30. The deactivating threshold value calculating means updates a deactivating threshold value based on the assigned threshold values transmitted from the ECUs 1A-1C. For example, the deactivating threshold value calculating means calculates a total value of the assigned threshold values and sets the total value as the deactivating threshold value. The electric current value detecting means detects an electric current that flows in the power source line 100. The power source switch deactivating means deactivates the power source switch 110 when the electric current detected by the current detecting means is greater than the deactivating threshold value.

The operating state of each of the ECUs 1A-1C is switchable among a plurality of operating modes. The assigned threshold value of each of the ECUs 1A-1C is set to be a different value for each of the operating modes. Each time when the operating state of each of the ECUs 1A-1C transfers from one of the operating modes to another of the operating modes, each of the ECUs 1A-1C calculates the assigned threshold value corresponding to the operating mode after transferring and transmits the information about the assigned threshold value to the monitoring device 1E through the communicating line 30.

The ECU 1A is set to a normal mode (i.e., a run mode) when the ignition switch 50 is set at the IG-ON position. The ECU 1A repeats a wake-up mode (i.e., an operation in the run mode) and the sleep mode periodically when the ignition switch 50 is set at the IG-OFF position or the ACC-ON position. For example, the ECU 1A is provided for controlling a transmitting device that transmits a polling signal to a portable key used for a smart entry system and a receiving device that receives a reply signal from the portable key. The assigned threshold value is set regardless of the position of the ignition switch 50. When the ECU 1A is set to the sleep mode, the assigned threshold value of the ECU 1A is set to 1 mA, for example. When the ECU 1A is set to the run mode including the wake-up mode, the assigned threshold value of the ECU 1A is set to 200 mA, for example.

The ECU 1B is set to the run mode when the ignition switch 50 is set at the IG-ON position and the ECU 1B is set to the sleep mode when the ignition switch 50 is set at the IG-OFF position or the ACC-ON position. For example, the ECU 1B is provided for controlling a tire-pressure monitoring device. When the ignition switch 50 is set at the IG-OFF position or the ACC-ON position and the ECU 1B is set to the sleep mode, the assigned threshold value of the ECU 1B is set to 1 mA, for example. When the ignition switch 50 is set at the IG-ON position and the ECU 1B is set to the run mode, the assigned threshold value of the ECU 1B is set to 200 mA, for example.

The ECU 1C is set to a complete deactivated mode when the ignition switch 50 is set at the IG-OFF position and ECU 1C is set to the run mode when the ignition switch 50 is set at the IG-ON position or the ACC-ON position. The ECU 1C does not switched between the sleep mode and the wake-up mode. For example, the ECU 1C is provided for controlling a car navigation switch or a car audio system. When the ignition switch 50 is set at the IG-OFF position, the assigned threshold value of the ECU 1C is set to 0 mA, for example. When the ignition switch 50 is set at the ACC-ON position or the IG-ON position, the assigned threshold value of the ECU 1C is set to 200 mA, for example, When the electric current that flows in the power source line 100 exceeds the deactivating threshold value, the monitoring device 1E waits for a sufficient time for updating the assigned threshold value of each of the ECUs 1A-1C from the assigned value corresponding to the power-saving mode including the sleep mode and the complete deactivated mode (i.e., 1 mA or 0 mA) to the assigned value corresponding to the run mode including the wake-up mode (i.e., 200 mA). Then, the monitoring device 1E recalculates the deactivating threshold value and controls the power source switch 110 based on the recalculated deactivating threshold value.

The assigned threshold values of the ECU 1B and the ECU 1C are set to fixed values in accordance with the position of the ignition switch 50. The assigned threshold value of the ECU 1B is fixed at 1 mA when the ignition switch 50 is set at the IG-OFF position or the ACC-ON position and the assigned threshold value of the ECU 1B is fixed at 200 mA when the ignition switch 50 is set at the IG-ON position. The assigned threshold value of the ECU 1C is fixed at 0 mA when the ignition switch 50 is set at the IC-OFF position and the assigned threshold value of the ECU 1C is fixed at 200 mA when the ignition switch 50 is set at the ACC-ON position or the IG-ON position. The ignition monitoring part IG provides selected position detecting means for detecting the selected position of the ignition switch 50. The monitoring device 1E receives a signal from the ignition monitoring part 1G in accordance with the detected position of the ignition switch 50. The monitoring device 1E controls the power source switch 110 in accordance with the deactivating threshold value corresponding to the detected position of the ignition switch 50.

Figure 4:
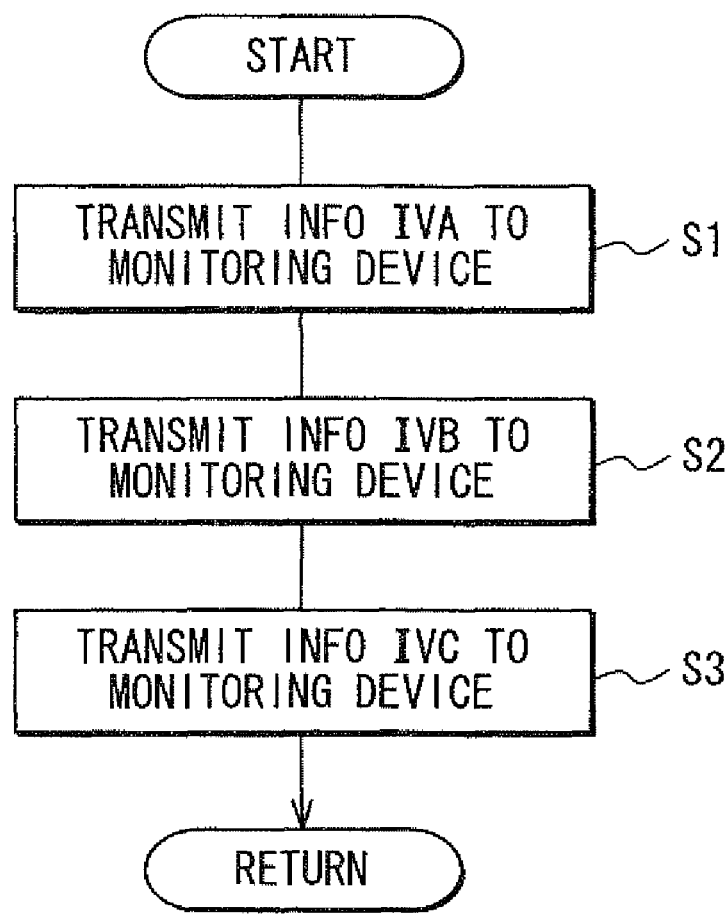
FIG. 4 is a flowchart illustrating a part of a self-information transmitting process performed by the electronic control unit.

An exemplary operating process of the power supply control system 200 will now be described with reference to FIG. 4-FIG. 8. As illustrated in FIG. 4, each of the ECUs 1A-1C transmits self-information to the monitoring device 1E. For example, at S1, each of the ECUs 1A-1C transmits information IVA including the assigned threshold value of each of the operating modes to the monitoring device 1E. In a case of the ECU 1A, the assigned threshold value at the sleep mode is 1 mA, and the assigned threshold value at the run mode including the wake-up mode is 200 mA. At S2, each of the ECUs 1A-1C transmits information IVB including the present operating mode to the monitoring device 1E. At S3, each of the ECUs 1A-1C transmits information IVC including a default operating mode of each of the positions of the ignition switch 50 to the monitoring device 1E. As described above, in the ECU 1B and the ECU 1C, the operating modes and the assigned threshold values are fixed in accordance with the position of the ignition switch 50 in the ECU 1A, the operating mode is fixed at the run mode and the assigned threshold value is fixed at 200 mA when the ignition switch 50 is set at the IG-ON position. When the ignition switch 50 is set at the IG-OFF position or the ACC-ON position, for example, the sleep mode is set as the default mode of the ECU 1A. The above-described order of the processes at S1-S3 may be changed or the processes at S1-S3 may be performed at a time.

Figure 5:
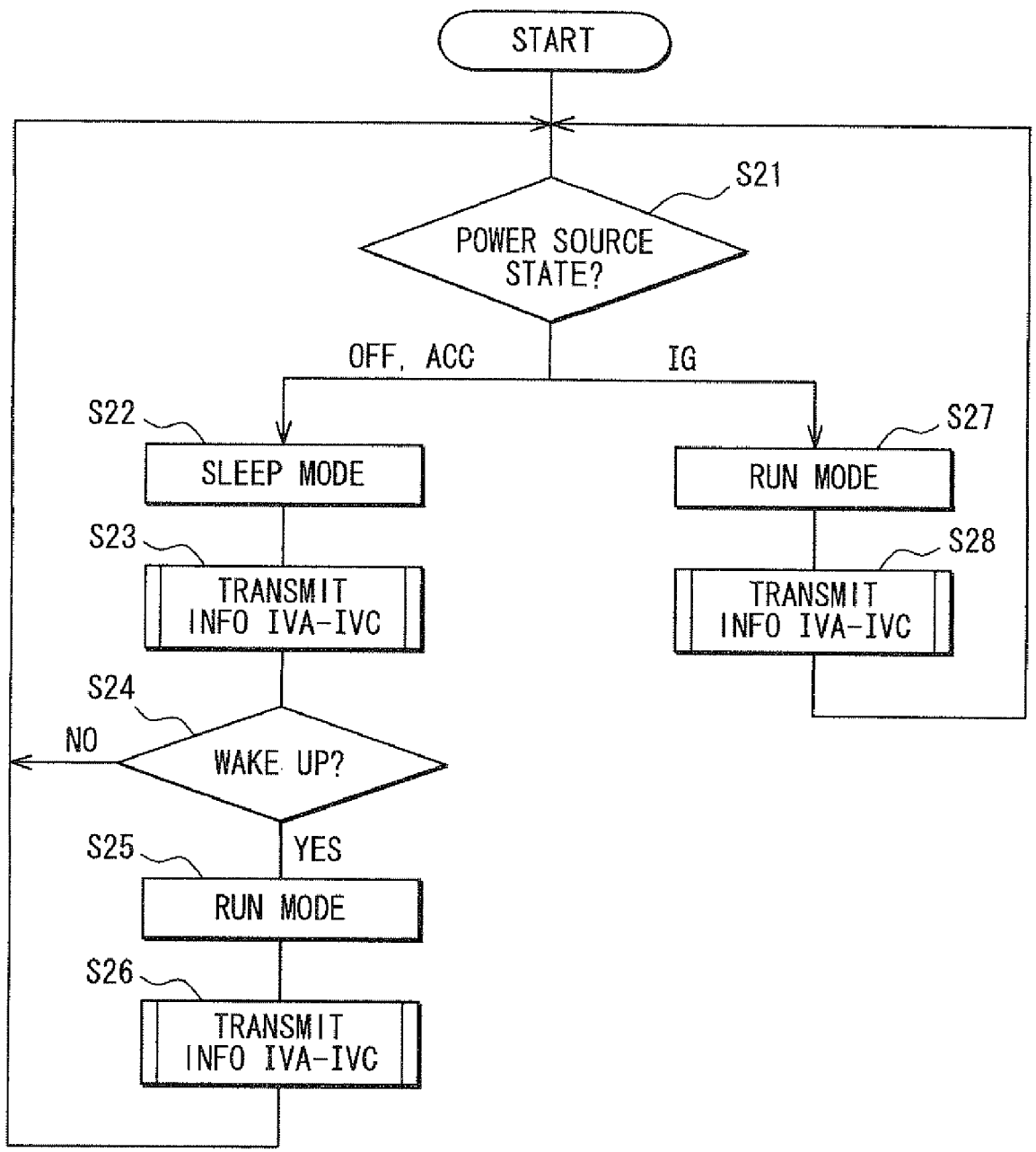
FIG. 5 is a flowchart illustrating the self-information transmitting process performed by the electronic control unit.

The self-information transmitting process performed by the ECUs 1A-1C will be described taking a case of the ECU 1A as an example. As illustrated in FIG. 5, at S21, the ECU 1A determines the power source state depending on the position of the ignition switch 50 based on the signal from the ignition monitoring part 1G When the ignition switch 50 is set at the IG-OFF position or the ACC-ON position, the ECU 1A determines that the default mode is the sleep mode at S22 and transmits the information IVA-IVC corresponding to the sleep mode to the monitoring device 1E at S23. When the ignition switch 50 is set at the IG-ON position, the ECU 1A determines that the operating state is the run mode at S27 and transmits information IVA-IVC corresponding to the run mode at S28. After the process at S23, the ECU 1A determines whether the present operating mode is the wake-up mode at S24. When the present operating mode is the wake-up mode, corresponding to "YES" at S24, the ECU 1A proceeds to S25 and S26 where the ECU 1A transmits information IVA-IVC corresponding to the wake-up mode (i.e., the run mode) to the monitoring device 1E.

Figure 6:
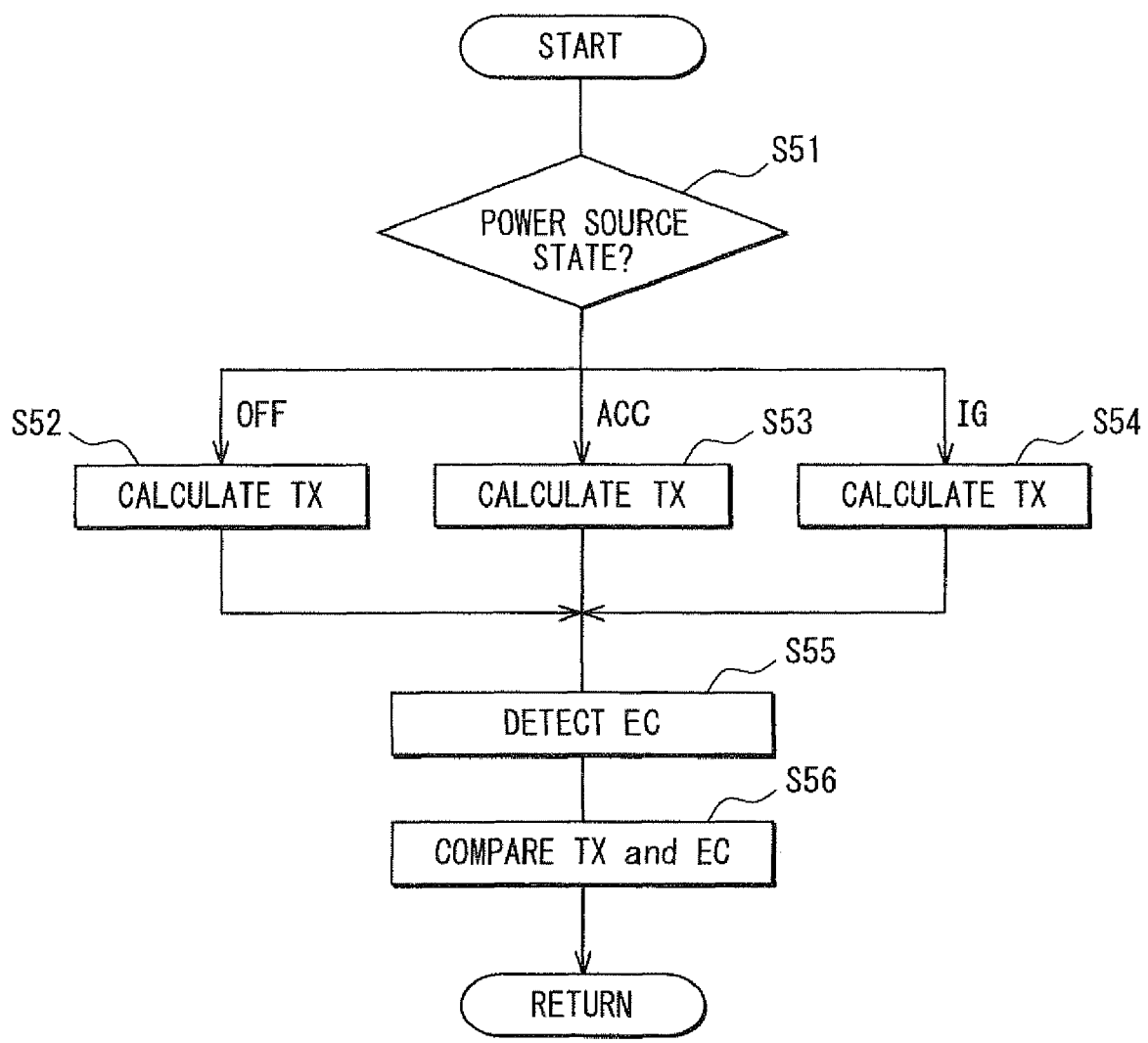
FIG. 6 is a flowchart illustrating a circuit monitoring process performed by the monitoring device.

A circuit monitoring process performed by the monitoring device 1E will be described with reference to FIG. 6. At S51, the monitoring device 1E determines the power source state depending on the position of the ignition switch 50 based on the signal from the ignition monitoring part 1G. When the ignition switch 50 is set at the IG-OFF position, the monitoring device 1E proceeds to S52 where the monitoring device 1E calculates the deactivating threshold value (TX) at the IG-OFF position by adding the assigned threshold values (TA) of the ECUs 1A-1C included in the information IVA-IVC transmitted from the ECUs 1A-1C. When the ignition switch 50 is set at the ACC-ON position, the monitoring device 1E proceeds to S53 where the monitoring device 1E calculates the deactivating threshold value (TX) at the ACC-position by adding the assigned threshold values (TA) of the ECUs 1A-1C included in the information IVA-IVC transmitted from the ECUs 1A-1C. When the ignition switch 50 is set at the IG-ON position, the monitoring device proceeds to S54 where the monitoring device 1E calculates the deactivating threshold value (TX) at the IG-ON position by adding the assigned threshold values (TA) of the ECUs 1A-1C included in the information IVA-IVC transmitted from the ECUs 1A-1C. At S55, the monitoring device 1E detects the present electric current value (EC) that flows in the power source line 100. At S56, the monitoring device 1E compares the deactivating threshold value (TX) and the present electric current value (EC). When the present electric current value (EC) is greater than the deactivating threshold value (TX), the monitoring device 1E determines that the present electric current value (EC) is in an abnormal level. When the present electric current value (EC) is equal to or less than the deactivating threshold value (TX), the monitoring device 1E determines that the present electric current value (EC) is in a normal level.

Figure 7:
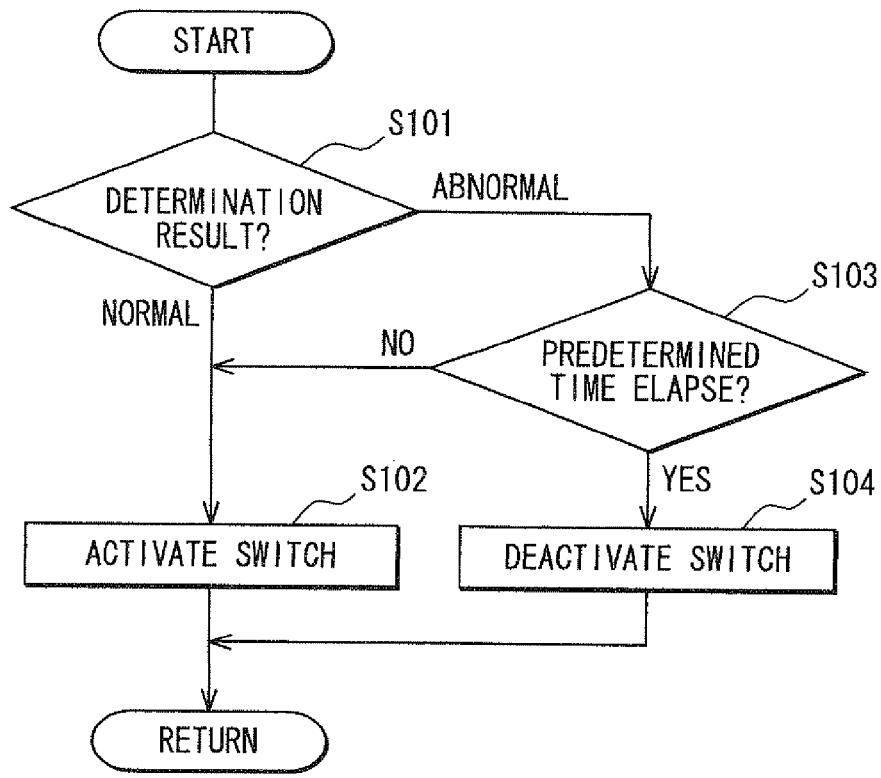
FIG. 7 is a flowchart illustrating a power-source switch control process performed by the monitoring device.
Figure 8:
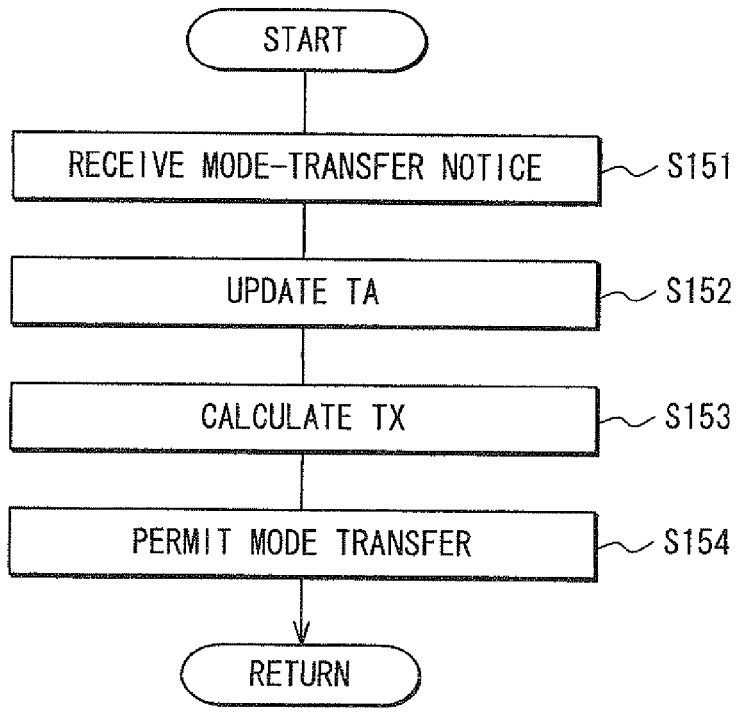
FIG. 8 is a flowchart illustrating a mode-transfer permitting process performed by the monitoring device.

A power source switch control process performed by the monitoring device 1E will be described with reference to FIG. 7. At S110, the monitoring device 1E reads the determination result of the circuit monitoring process. When the present electric current (EC) is in the normal level, the monitoring device 1E proceeds to S102 where the monitoring device 1E maintains an activated state of the power source switch 110 so as to continue the power supply to the ECUs 1A-1C. When the present electric current (EC) is in the abnormal level the monitoring device 1E sets a deactivating timer based on a timer set routine (not shown). The monitoring device 1E sets the deactivating timer using an event where the electric current value changes from the normal level to the abnormal level as a trigger. At S103, the monitoring device 1E determines whether the deactivating timer reaches a predetermined time. If one of the ECUs 1A-1C transfers from the sleep mode to the run mode, a consumption current of corresponding one of the ECUs 1A-1C rapidly increases. Thus, the increase of the consumption current due to the mode transfer is not abnormal. Accordingly, the monitoring device 1 E waits for the predetermined time for securing a possibility that the assigned threshold value of each of the ECUs 1A-1C is updated from the assigned value corresponding to the power-saving mode (i.e., 1 mA or 0 mA) to the assigned value corresponding to the run mode (i.e., 200 mA). When the predetermined time has not elapsed, corresponding to "NO" at S103, the monitoring device 1E proceeds to S102 where the monitoring device 1E maintains the activated state of the power source switch 110. When the predetermined time has elapsed, corresponding to "YES" at S103, the monitoring device 1E proceeds to S104 where the monitoring device 1E deactivates the power source switch 110. Thereby, the power supply to all of the ECUs 1A-1C is stopped at a time. The monitoring device 1E repeats the power source switch control process periodically. Thus, each time when the monitoring device 1E proceeds to S101, the monitoring device 1E reacquires the determination result.

For example, when the ignition switch 50 is set at IG-ON position, each of the assigned threshold value transmitted from the ECUs 1A-1C is 200 mA. Thus, the deactivating threshold value is 600 mA. If electric current greater than 600 mA is detected on the power source line 100, for example, due to a short of the power source lime 100, the power source switch 110 is deactivated.

When the ignition switch is set at IG-OFF position, the assigned threshold value transmitted from the ECU 1A is 1 mA if the ECU 1A is set at the sleep mode In addition, the assigned threshold value transmitted from the ECU 1B is 1 mA, and the assigned threshold value transmitted from the ECU 1C is 0 mA. Thus, the deactivating threshold value is 2 mA. If in one of the ECUs 1A-1C that should be at the sleep mode or the complete deactivated mode, the clock operation of the CPU 3 is continued, for example, due to a runaway, the electric current that flows in the power source line 100 exceeds the deactivating threshold value of 2 mA and the power source switch 110 is deactivated. Thereby, a drain of the battery B due to the runaway is restricted.

When the ECU 1A wakes up, the assigned threshold value transmitted from the ECU 1A becomes 200 mA and the assigned threshold values transmitted from the ECU 1B and ECU 1C remain 1 mA and 0 mA, respectively. Thus, the deactivating threshold value becomes 201 mA. If the ECU 1B that should be at the sleep mode runaways and the clock operation of the CPU 3 in the ECU 1B continues, the electric current that flows in the power source line 100 may exceed the deactivating threshold value of 201 mA and the power source switch 110 is deactivated. Thus, a drain of the battery B due to a dark-current caused by the runaway of the ECU 1B can be restricted.

Before transferring the operating mode, each of the ECUs 1A-1C may transmit a mode-transfer notice to the monitoring device 1E. A mode-transfer permitting process performed by the monitoring device 1E will be described with reference to FIG. 8. At S151, the monitoring device 1E receives the mode-transfer notice from each of the ECUs 1A-1C. At S152, the monitoring device 1E updates the assigned threshold values (TA) of the ECUs 1A-1C to the assigned values corresponding to the operating mode after transferring. At S153, the monitoring device 1E calculates the deactivating threshold value (TX) based on the updated assigned threshold value (TA). Then, at S154, the monitoring device 1E transmits a permission of the mode transfer to each of the ECUs 1A-1C and ECUs 1A-1C transfers the operating state after receiving the permission of the mode transfer.

In the power supply control system 200 according to the present embodiment, each of the ECUs 1A-1C coupled with the same power source line 100 transmits the information of its own operating state or its own assigned threshold value set in accordance with the operating state to the monitoring device 1E through the communicating line 30. The monitoring device 1E updates the deactivating threshold value based on the assigned threshold values of the ECUs 1A-1C and deactivates the power source switch 110 disposed on the power source line 100 when the electric current value of the power source line 100 is greater than the deactivating threshold value. Thus, when an abnormality in the electric current occurs, the power supply to all of the ECUs 1A-1C can be stopped at a time by deactivating the power source switch 110. Furthermore, because the assigned threshold value of each of the ECUs 1A-1C can be updated in accordance with the operating state of the ECUs 1A-1C, the deactivating threshold value can be updated in accordance with the operating state of each of the ECUs 1A-1C. Thus, even if the abnormality in the electric current occurs in a middle level between the deactivating threshold value at the power-saving mode and the deactivating threshold value at the run mode, the power source switch 110 can be deactivated with certainty in accordance with the operating state of each of the ECUs 1A-1C.

The total amount of the electric current supplied to each of the ECU 1A-1C is the total electric current value that flows in the power source line 100. Thus, the deactivating threshold value can be rationally calculated by adding the assigned threshold value of each of the ECUs 1A-1C.

In a case where the electronic devices controlled by the ECUs 1A-1C are provided in the vehicle and the power source line 100 supplies the operating voltage from the battery equipped in the vehicle to the ECUs 1A-1C, the drain of the battery due to the dark current generated in the ECUs 1A-1C can be restricted.

As described above, the operating state of each of the ECUs 1A-1C is switchable among the operating modes. In addition, the assigned threshold value of each of the ECUs 1A-1C is set to be a different value for each of the operating modes. The assigned threshold value setting means updates the assigned threshold value of each of the ECUs 1A-1C each time the operating state of each of the ECUs 1A-1C transfers from one of the operating modes to another of the operating modes so that the assigned threshold value corresponds to the operating mode after transferring. Each of the ECUs 1A-1C transmits the information about the operating mode after transferring or the assigned threshold value corresponding to the operating mode after transferring to the monitoring device 1E. When the assigned threshold value is set to a fixed value for each of the operating modes, the number of operating state that should be determined becomes a similar level to the number of the operating modes. Thus, the calculation of the assigned threshold values can be simplified.

The operating modes may include the run mode and the power-saving mode. A power consumption at the power-saving mode is lower than a power consumption at the run mode. Thus, the assigned threshold value at the power-saving mode may be set to be lower than the assigned threshold value at the run mode. In the present case, if a dark current generates due to a runaway of one of the ECUs 1A-1C and the abnormality in the electric current occurs in the middle level lower than the deactivating threshold value at the run mode, the power supply can be stopped with certainty. Thus, the drain of the battery due to the dark current can be restricted.

If one of the ECUs 1A-1C transfers from the power-saving mode to the run mode, the consumption current of corresponding one of the ECUs 1A-1C rapidly increases. If the assigned threshold value of the corresponding one of the ECUs 1A-1C remains the assigned threshold value corresponding to the power-saving mode, the deactivating threshold value also remains a low value corresponding to the power-saving mode. Therefore, when the mode transfer occurs, the consumption current may rapidly increase and exceed the deactivating threshold value and the power source switch 110 may be deactivated. Thus, the power source switch deactivating means may wait to deactivate the power-source switch for the predetermined time longer than a time required for updating the assigned threshold value of each of the ECUs 1A-1C from the assigned threshold value corresponding to the power-saving mode to the assigned threshold value corresponding to the run mode. In the present case, the power source switch deactivating means may reacquire the deactivating threshold value after the predetermined time has elapsed and may deactivate the power source switch 110 when the electric current value is greater than the reacquired deactivating threshold value. Thereby, the rapid increase of the consumption current due to the mode transfer is not determined as an abnormal and the power source switch 110 is maintained at the activating state.

Alternatively, each of the ECUs 1A-1C may transmit a mode-transfer notice to the monitoring device 1E before each of the ECUs 1A-1C transfers the operating state. The monitoring device 1E updates the deactivating threshold value so as to correspond to the operating mode after transferring and transmits the permission of the mode transfer to each of the ECUs 1A-1C. Each of the ECUs 1A-1C transfers the operating state after receiving the permission of the mode transfer. In the present case, each of the ECUs 1A-1C transfers the operating state after the deactivating threshold value is updated. Thus, the rapid increase of the consumption current due to the mode transfer is not determined as an abnormal and the power source switch 110 is maintained at the activating state.

Each of the ECUs 1A-1C coupled with the power source line 100 may be divided into a plurality of power source systems and the selector switch may be provided for switching the power-receiving state of each of the ECUs 1A-1C from the power source line for each of the power source systems. In addition, the assigned threshold value setting means may set the assigned threshold value of each of the ECUs 1A-1C to have a different value for each of the position of the selector switch. In the present case, the power-receiving state of each of the ECU 1A-1C changes in accordance with the position of the selector switch. Thus, the number of the operating states that should be determined for each of the ECUs 1A-1C can be reduced to the number of the selectable positions of the selector switch. Thus, the calculation of the assigned threshold value can be simplified. When the operating mode is fixed for each of the positions of the selector switch in a manner similar to the ECU 1B and the ECU 1C, the calculation of the assigned threshold value can be further simplified.

What is claimed is:

1. A power supply control system, comprising:
    a plurality of electronic control units, each of the plurality of electronic control units configured to control an electronic device independently of the others of the plurality of electronic control units;
    a monitoring device;
    a communicating line coupling the each of the plurality of electronic control units and the monitoring device;
    a power source line coupled with the each of the plurality of electronic control units for supplying an operating voltage to the each of the electronic control units;
    a power source switch disposed on the power source line and configured to stop the supply of the operating voltage to all of the plurality the electronic control units when the power source switch is deactivated;
    assigned threshold value setting means provided in the each of the plurality of electronic control units for setting an assigned threshold value of the each of the plurality of electronic control units in accordance with an operating state of the each of the plurality of electronic control units;
    self-information transmitting means provided in the each of the plurality of electronic control units for transmitting information about the operating state and the assigned threshold value set in accordance with the operating state to the monitoring device through the communicating line;
    deactivating threshold value calculating means provided in the monitoring device for calculating a deactivating threshold value based on the assigned threshold value of the each of the plurality of electronic control units;
    electric current value detecting means provided in the monitoring device for detecting an electric current value of the power source line; and
    power-source switch deactivating means provided in the monitoring device for deactivating the power source switch when the electric current value is greater than the deactivating threshold value;
    wherein the operating state of the each of the plurality of electronic control units is switchable among a plurality of operating modes and the assigned threshold value of the each of the plurality of electronic control units is set to be a different value for each of the plurality of operating modes.

2. The power supply control system according to claim 1, wherein
    the deactivating threshold value calculating means calculates the deactivating threshold valued by adding the assigned threshold value of the each of the plurality of electronic control units.

3. The power supply control system according to claim 1, wherein:
    the each of the plurality of electronic control units is configured to control an electronic device provided in a vehicle; and
    the power source line is coupled with a battery of the vehicle so as to supply the operating voltage from the battery to the each of the plurality of electronic control units.

4. The power supply control system according to claim 1, wherein:
    the operating state of the each of the plurality of electronic control units is switchable among a plurality of operating modes;
    the assigned threshold value of the each of the plurality of electronic control units is set to be a different value for each of the plurality of operating modes;
    the assigned threshold value setting means updates the assigned threshold value of the each of the plurality of electronic control units each time the operating state of the each of the plurality of electronic control units transfers from one of the plurality of operating modes to another of the plurality of operating modes so that the assigned threshold value corresponds to the operating mode after transferring; and
    the each of the plurality of electronic control units transmits information about the operating mode after transferring or the assigned threshold value corresponding to the operating mode after transferring to the monitoring device through the communicating line.

5. The power supply control system according to claim 4, wherein:
the plurality of operating mode includes a run mode having a first power consumption and a power-saving mode having a second power consumption;
the second power consumption is lower than the first power consumption; and
the assigned threshold value at the power-saving mode is lower than the assigned threshold value at the run mode.

6. The power supply control system according to claim 5, wherein:
the power-source switch deactivating means waits to deactivate the power source switch for a predetermined time since the electric current value exceeds the deactivating threshold value;
the predetermined time is longer than a time required for updating the assigned threshold value of the each of the plurality of electronic control units from the assigned threshold value corresponding to the power-saving mode to the assigned threshold value corresponding to the run mode;
the power-source switch deactivating means reacquires the deactivating threshold value after the predetermined time has elapsed; and
the power-source switch deactivating means deactivates the power source switch when the electric current value is greater than the reacquired deactivating threshold value.

7. The power supply control system according to claim 5, wherein:
the each of the plurality of electronic control units transmits a mode-transfer notice to the monitoring device before the operating state of the each of the plurality of electronic control units transfers from one of the plurality of operating modes to another of the plurality of operating modes;
the monitoring device updates the deactivating threshold value based on the assigned threshold value of the each of the plurality of electronic control units corresponding to the operating mode after transferring and transmits a permission of the mode transfer to the each of the plurality of electronic control units; and
the each of the plurality of electronic control units transfers the operating state after receiving the permission of the mode transfer.

8. The power supply control system according to claim 1 further comprising a selector switch, wherein:
the each of the plurality of electronic control units coupled with the power source line is divided into a plurality of power source systems;
the selector switch is switchable to a power-receiving state of the each of the plurality of electronic control units from the power source line for each of plurality of the power source systems; and
the assigned threshold value setting means sets the assigned threshold value of the each of the plurality of electronic control units in accordance with a position of the selector switch.

9. A method of controlling by a monitoring device a power supply from a power source line to a plurality of electronic control units coupled with the power source line and communicatively coupled to the monitoring device, the method comprising:
setting an assigned threshold value each of the plurality of electronic control units in accordance with an operating state of the each of the plurality of electronic control units;
receiving from the each of the plurality of electronic control units the assigned threshold value in the each of the plurality of electronic control units;
calculating by the monitoring device a deactivating threshold value based on the received assigned threshold values of the each of the plurality of electronic control units;
detecting an electric current value of the power source line;
determining whether the electric current value is greater than the deactivating threshold value; and
deactivating a power source switch provided on the power source line when the electric current value is greater than the deactivating threshold value so as to stop the power supply from the power source line to all of the plurality of electronic control units;
wherein the operating state of the each of the plurality of electronic control units is switchable among a plurality of operating modes and the assigned threshold value of the each of the plurality of electronic control units is set to be a different value for each of the plurality of operating modes.

10. The method according to claim 9, wherein:
the deactivating threshold value is calculated by adding the assigned threshold value of the each of the plurality of electronic control units.

11. The method according to claim 9, wherein:
the assigned threshold value of the each of the plurality of electronic control units is updated each time the operating state of the each of the plurality of electronic control units transfers from one of the plurality of operating modes to another of the plurality of operating modes so that the assigned threshold value corresponds to the operating mode after transferring; and
the deactivating threshold value is calculated based on the updated assigned threshold value of the each of the plurality of electronic control units.

12. The method according to claim 11, wherein:
the plurality of operating mode includes a run mode having a first power consumption and a power-saving mode having a second power consumption;
the second power consumption is lower than the first power consumption; and
the assigned threshold value at the power-saving mode is lower than the assigned threshold value at the run mode.

13. The method according to claim 12, further comprising:
starting a timer when the electric current value exceeds the deactivating threshold value; and
recalculating the deactivating threshold value after the timer reaches a predetermined time, wherein:
the predetermined time is longer than a time required for updating the assigned threshold value of the each of the plurality of electronic control units from the assigned threshold value corresponding to the power saving mode to the assigned threshold value corresponding to the run mode; and
the deactivating the power source switch is performed when the electric current value is greater than the recalculated deactivating threshold value.

14. The method according to claim 11, wherein:
the assigned threshold value of the each of the plurality of the electronic control units is updated before the operating state of the each of the plurality of the electronic control units transfers; and
the deactivating threshold value is calculated based on the updated assigned threshold value of the each of the plurality of the electronic control units before the operating state of the each of the plurality of the electronic control units transfers.

* * * * *